US006348275B1

(12) United States Patent
DeCristofaro et al.

(10) Patent No.: US 6,348,275 B1
(45) Date of Patent: Feb. 19, 2002

(54) BULK AMORPHOUS METAL MAGNETIC COMPONENT

(75) Inventors: Nicholas John DeCristofaro, Chatham; Peter Joseph Stamatis, Morristown; Gordon Edward Fish, Upper Montclair, all of NJ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/544,033

(22) Filed: Apr. 6, 2000

Related U.S. Application Data

(63) Continuation-in-part of application No. 09/477,905, filed on Jan. 5, 2000, which is a continuation-in-part of application No. 09/186,914, filed on Nov. 6, 1998.

(51) Int. Cl.[7] .................................................. G11B 5/66

(52) U.S. Cl. .............................. 428/692; 428/694 TM; 428/900; 335/281; 335/284; 335/296

(58) Field of Search ......................... 428/692, 694 TM, 428/900; 335/281, 284, 296

(56) References Cited

U.S. PATENT DOCUMENTS

| | | | | |
|---|---|---|---|---|
| 4,672,346 A | | 6/1987 | Miyamoto et al. | 335/296 |
| 4,734,975 A | | 4/1988 | Ballard et al. | 29/606 |
| 4,766,378 A | | 8/1988 | Danby et al. | 324/307 |
| 4,818,966 A | | 4/1989 | Miyamoto et al. | 335/296 |
| 4,827,235 A | | 5/1989 | Inomata et al. | 335/297 |
| 4,887,059 A | | 12/1989 | Asano et al. | 335/281 |
| 4,892,773 A | | 1/1990 | Chenoweth et al. | 428/121 |
| 5,061,897 A | | 10/1991 | Danby et al. | 324/318 |
| 5,124,651 A | | 6/1992 | Danby et al. | 324/318 |
| 5,134,771 A | | 8/1992 | Lee et al. | 29/609 |
| 5,283,544 A | * | 2/1994 | Sakurai | 335/297 |
| 5,495,222 A | | 2/1996 | Abele et al. | 335/306 |
| 5,754,085 A | | 5/1998 | Danby et al. | 335/297 |
| 5,798,680 A | | 8/1998 | Abele et al. | 335/301 |
| 5,963,117 A | | 10/1999 | Ohashi et al. | 335/306 |
| 6,014,070 A | | 1/2000 | Danby et al. | 335/296 |

FOREIGN PATENT DOCUMENTS

| | | |
|---|---|---|
| EP | 0 984 461 A2 | 3/2000 |
| EP | 1 004 888 A1 | 5/2000 |
| EP | 1 004 889 A2 | 5/2000 |
| EP | 1 004 889 A3 | 5/2000 |
| JP | 58-148418 | 9/1983 |
| JP | 58-148419 | 9/1983 |
| JP | 59-181504 | 10/1984 |
| JP | 61-131518 | 6/1986 |
| WO | WO 94/14994 | 7/1994 |
| WO | WO 95/21044 | 8/1995 |
| WO | WO 95/33596 | 12/1995 |
| WO | WO 96/00449 | 1/1996 |
| WO | WO 00 28556 | 5/2000 |

* cited by examiner

*Primary Examiner*—Leszek Kiliman
(74) *Attorney, Agent, or Firm*—Roger H. Criss

(57) ABSTRACT

A bulk amorphous metal magnetic component has a plurality of layers of ferromagnetic amorphous metal strips laminated together to form a generally three-dimensional part having the shape of a polyhedron. The bulk amorphous metal magnetic component may include an arcuate surface, and preferably includes two arcuate surfaces that are disposed opposite each other. The magnetic component is operable at frequencies ranging from between approximately 50 Hz and 20,000 Hz. When the component is excited at an excitation frequency "f" to a peak induction level $B_{max}$, it exhibits a core-loss less than "L" wherein L is given by the formula $L=0.0074\, f\, (B_{max})^{1.3}+0.000282\, f^{1.5}(B_{max})^{2.4}$, said core loss, said excitation frequency and said peak induction level being measured in watts per kilogram, hertz, and teslas, respectively. Performance characteristics of the bulk amorphous metal magnetic component of the present invention are significantly better when compared to silicon steel components operated over the same frequency range.

10 Claims, 3 Drawing Sheets

BULK AMORPHOUS METAL MAGNETIC COMPONENT

CROSS-REFERENCE TO RELATED APPLICATION

This application is a continuation-in-part of application Ser. No. 09/477,905 filed Jan. 5, 2000 which, in turn is a continuation-in-part of application Ser. No. 09/186,914, filed Nov. 6, 1998, entitled "Bulk Amorphous Metal Magnetic Components."

BACKGROUND OF THE INVENTION

1. Field of the Invention

This invention relates to amorphous metal magnetic components; and more particularly, to a generally three-dimensional bulk amorphous metal magnetic component for large electronic devices such as magnetic resonance imaging systems, television and video systems, and electron and ion beam systems.

2. Description of the Prior Art

Magnetic resonance imaging (MRI) has become an important, non-invasive diagnostic tool in modern medicine. An MRI system typically comprises a magnetic field generating device. A number of such field generating devices employ either permanent magnets or electromagnets as a source of magnetomotive force. Frequently the field generating device further comprises a pair of magnetic pole faces defining a gap with the volume to be imaged contained within this gap.

U.S. Pat. No. 4,672,346 teaches a pole face having a solid structure and comprising a plate-like mass formed from a magnetic material such as carbon steel. U.S. Pat. No. 4,818,966 teaches that the magnetic flux generated from the pole pieces of a magnetic field generating device can be concentrated in the gap therebetween by making the peripheral portion of the pole pieces from laminated magnetic plates. U.S. Pat. No. 4,827,235 discloses a pole piece having large saturation magnetization, soft magnetism, and a specific resistance of 20 $\mu\Omega$-cm or more. Soft magnetic materials including permalloy, silicon steel, amorphous magnetic alloy, ferrite, and magnetic composite material are taught for use therein.

U.S. Pat. No. 5,124,651 teaches a nuclear magnetic resonance scanner with a primary field magnet assembly. The assembly includes ferromagnetic upper and lower pole pieces. Each pole piece comprises a plurality of narrow, elongated ferromagnetic rods aligned with their long axes parallel to the polar direction of the respective pole piece. The rods are preferably made of a magnetically permeable alloy such as 1008 steel, soft iron, or the like. The rods are transversely electrically separated from one another by an electrically non-conductive medium, limiting eddy current generation in the plane of the faces of the poles of the field assembly. U.S. Pat. No. 5,283,544, issued Feb. 1, 1994, to Sakurai et al. discloses a magnetic field generating device used for MRI. The devices include a pair of magnetic pole pieces which may comprise a plurality of block-shaped magnetic pole piece members formed by laminating a plurality of non-oriented silicon steel sheets.

Notwithstanding the advances represented by the above disclosures, there remains a need in the art for improved pole pieces. This is so because it is these pieces which are essential for improving the imaging capability and quality of MRI systems.

Although amorphous metals offer superior magnetic performance when compared to non-oriented electrical steels, they have long been considered unsuitable for use in bulk magnetic components such as the tiles of poleface magnets for MRI systems due to certain physical properties of amorphous metal and the corresponding fabricating limitations. For example, amorphous metals are thinner and harder than non-oriented silicon steel and consequently cause fabrication tools and dies to wear more rapidly. The resulting increase in the tooling and manufacturing costs makes fabricating bulk amorphous metal magnetic components using such techniques commercially impractical. The thinness of amorphous metals also translates into an increased number of laminations in the assembled components, further increasing the total cost of the amorphous metal magnetic component.

Amorphous metal is typically supplied in a thin continuous ribbon having a uniform ribbon width. However, amorphous metal is a very hard material making it very difficult to cut or form easily, and once annealed to achieve peak magnetic properties, becomes very brittle. This makes it difficult and expensive to use conventional approaches to construct a bulk amorphous metal magnetic component. The brittleness of amorphous metal may also cause concern for the durability of the bulk magnetic component in an application such as an MRI system.

Another problem with bulk amorphous metal magnetic components is that the magnetic permeability of amorphous metal material is reduced when it is subjected to physical stresses. This reduced permeability may be considerable depending upon the intensity of the stresses on the amorphous metal material. As a bulk amorphous metal magnetic component is subjected to stresses, the efficiency at which the core directs or focuses magnetic flux is reduced. This results in higher magnetic losses, increased heat production, and reduced power. Such stress sensitivity, due to the magnetostrictive nature of the amorphous metal, may be caused by stresses resulting from magnetic forces during operation of the device, mechanical stresses resulting from mechanical clamping or otherwise fixing the bulk amorphous metal magnetic components in place, or internal stresses caused by the thermal expansion and/or expansion due to magnetic saturation of the amorphous metal material.

SUMMARY OF THE INVENTION

The present invention provides a low-loss, bulk amorphous metal magnetic component having the shape of a polyhedron and being comprised of a plurality of layers of ferromagnetic, amorphous metal strips. Also provided by the present invention is a method for making a bulk amorphous metal magnetic component. The magnetic component is operable at frequencies ranging from about 50 Hz to 20,000 Hz and exhibits improved performance characteristics when compared to silicon-steel magnetic components operated over the same frequency range. More specifically, a magnetic component constructed in accordance with the present invention and excited at an excitation frequency "f" to a peak induction level "$B_{max}$" will have a core loss at room temperature less than "L" wherein L is given by the formula $L=0.0074\ f\ (B_{max})^{1.3}+0.000282\ f^{1.5}\ (B_{max})^{2.4}$, the core loss, the excitation frequency and the peak induction level being measured in watts per kilogram, hertz, and teslas, respectively. Preferably, the magnetic component will have (i) a core-loss of less than or approximately equal to 1 watt-per-kilogram of amorphous metal material when operated at a frequency of approximately 60 Hz and at a flux density of approximately 1.4 Tesla (T); (ii) a core-loss of less than or approximately equal to 12 watts-per-kilogram of amorphous metal material when operated at a frequency of approximately 1000 Hz and at a flux density of approximately 1.0 T, or (iii) a core-loss of less than or approximately equal to 70 watt-per-kilogram of amorphous metal material when operated at a frequency of approximately 20,000 Hz and at a flux density of approximately 0.30T.

In a first embodiment of the present invention, a bulk amorphous metal magnetic component comprises a plurality of substantially similarly shaped layers of amorphous metal strips laminated together to form a polyhedrally shaped part.

The present invention also provides a method of constructing a bulk amorphous metal magnetic component. In a first embodiment of the method, amorphous metal strip material is cut to form a plurality of cut ferromagnetic amorphous metal strips having a predetermined length. The cut strips are stacked to form a bar of stacked ferromagnetic, amorphous metal strip material and annealed to enhance the magnetic properties of the material. The annealed, stacked bar is impregnated with an epoxy resin and cured. The preferred ferromagnetic amorphous metal material has a composition defined essentially by the formula $Fe_{80}B_{11}Si_9$.

In a second embodiment of the method, ferromagnetic amorphous metal strip material is wound about a mandrel to form a generally rectangular core having generally radiused corners. The generally rectangular core is then annealed to enhance the magnetic properties of the material. The core is then impregnated with epoxy resin and cured. The short sides of the rectangular core are then cut to form two magnetic components having a predetermined three-dimensional geometry that is the approximate size and shape of said short sides of said generally rectangular core. The radiused corners are removed from the long sides of the generally rectangular core and the long sides of the generally rectangular core are cut to form a plurality of polyhedrally shaped magnetic components having the predetermined three-dimensional geometry. The preferred amorphous metal material has a composition defined essentially by the formula $Fe_{80}B_{11}Si_9$.

The present invention is also directed to a bulk amorphous metal component constructed in accordance with the above-described methods.

Bulk amorphous metal magnetic components constructed in accordance with the present invention are especially suited for amorphous metal tiles for poleface magnets in high performance MRI systems; television and video systems; and electron and ion beam systems. The advantages afforded by the present invention include simplified manufacturing, reduced manufacturing time, reduced stresses (e.g., magnetostrictive) encountered during construction of bulk amorphous metal components, and optimized performance of the finished amorphous metal magnetic component.

BRIEF DESCRIPTION OF THE DRAWINGS

The invention will be more fully understood and further advantages will become apparent when reference is had to the following detailed description of the preferred embodiments of the invention and the accompanying drawings, wherein like reference numerals denote similar elements throughout the several views, and in which.

DETAILED DESCRIPTION OF THE PREFERRED EMBODIMENTS

Figure 1A:
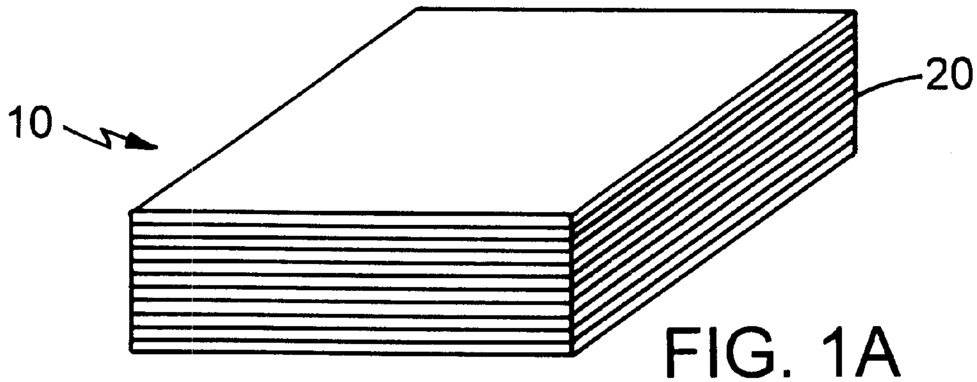
FIG. 1A is a perspective view of a bulk amorphous metal magnetic component having the shape of a generally rectangular polyhedron constructed in accordance with the present invention.

The present invention provides a generally polyhedrally shaped low-loss bulk amorphous metal component. Bulk amorphous metal components are constructed in accordance with the present invention having various geometries including, but not limited to, rectangular, square, and trapezoidal prisms. In addition, any of the previously mentioned geometric shapes may include at least one arcuate surface, and preferably two oppositely disposed arcuate surfaces to form a generally curved or arcuate bulk amorphous metal component. Furthermore, complete magnetic devices such as poleface magnets may be constructed as bulk amorphous metal components in accordance with the present invention. Those devices may have either a unitary construction or they may be formed from a plurality of pieces which collectively form the completed device. Alternatively, a device may be a composite structure comprised entirely of amorphous metal parts or a combination of amorphous metal parts with other magnetic materials.

A magnetic resonance (MRI) imaging device frequently employs a magnetic pole piece (also called a pole face) as part of a magnetic field generating means. As is known in the art (see e.g., U.S. Pat. No. 5,283.544), such a field generating means is used to provide a steady magnetic field and a time-varying magnetic field gradient superimposed thereon. In order to produce a high-quality, high-resolution MRI image it is essential that the steady field be homogeneous over the entire sample volume to be studied and that the field gradient be well defined. This homogeneity can be enhanced by use of suitable pole pieces. The bulk amorphous metal magnetic component of the invention is suitable for use in constructing such a pole face.

The pole pieces for an MRI or other magnet system are adapted to shape and direct in a predetermined way the magnetic flux which results from at least one source of magnetomotive force (mmf). The source may comprise known mmf generating means, including permanent magnets and electromagnets with either normally conductive or superconducting windings. Each pole piece may comprise one or more bulk amorphous metal magnetic component as described herein.

It is desired that a pole piece exhibit good DC magnetic properties including high permeability and high saturation flux density. The demands for increased resolution and higher operating flux density in MRI systems have imposed a further requirement that the pole piece also have good AC magnetic properties. More specifically, it is necessary that the core loss produced in the pole piece by the time-varying gradient field be minimized. Reducing the core loss advantageously improves the definition of the magnetic field gradient and allows the field gradient to be varied more rapidly, thus allowing reduced imaging time without compromise of image quality.

The earliest magnetic pole pieces were made from solid magnetic material such as carbon steel or high purity iron, often known in the art as Armco iron (see e.g., U.S. Pat. No. 4,672,346). They have excellent DC properties but very high core loss in the presence of AC fields because of macroscopic eddy currents. Some improvement is gained by forming a pole piece of laminated conventional steels, as disclosed by U.S. Pat. No. 5,283,544.

Yet there remains a need for a further improvement in pole pieces, which exhibit not only the required DC properties but also substantially improved AC properties; the most important property being lower core loss. The requisite combination of high magnetic flux density, high magnetic permeability, and low core loss is afforded by use of the magnetic component of the present invention in the construction of pole pieces.

Figure 1B:
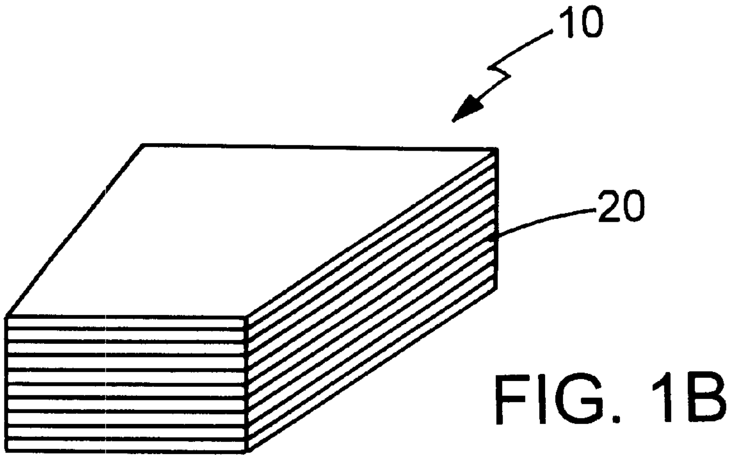
FIG. 1B is a perspective view of a bulk amorphous metal magnetic component having the shape of a generally trapezoidal polyhedron constructed in accordance with the present invention.

Referring now to the drawings in detail, there is shown in FIG. 1A a bulk amorphous metal magnetic component 10 having a three-dimensional generally rectangular shape. The magnetic component 10 is comprised of a plurality of substantially similarly shaped layers of ferromagnetic amorphous metal strip material 20 that are laminated together and annealed. The magnetic component depicted in FIG. 1B has a three-dimensional generally trapezoidal shape and is comprised of a plurality of layers of ferromagnetic amorphous metal strip material 20 that are each substantially the same size and shape and that are laminated together and annealed. The magnetic component depicted in FIG. 1C includes two oppositely disposed arcuate surfaces 12. The component 10 is constructed of a plurality of substantially similarly shaped layers of ferromagnetic amorphous metal strip material 20 that are laminated together and annealed.

Figure 1C:
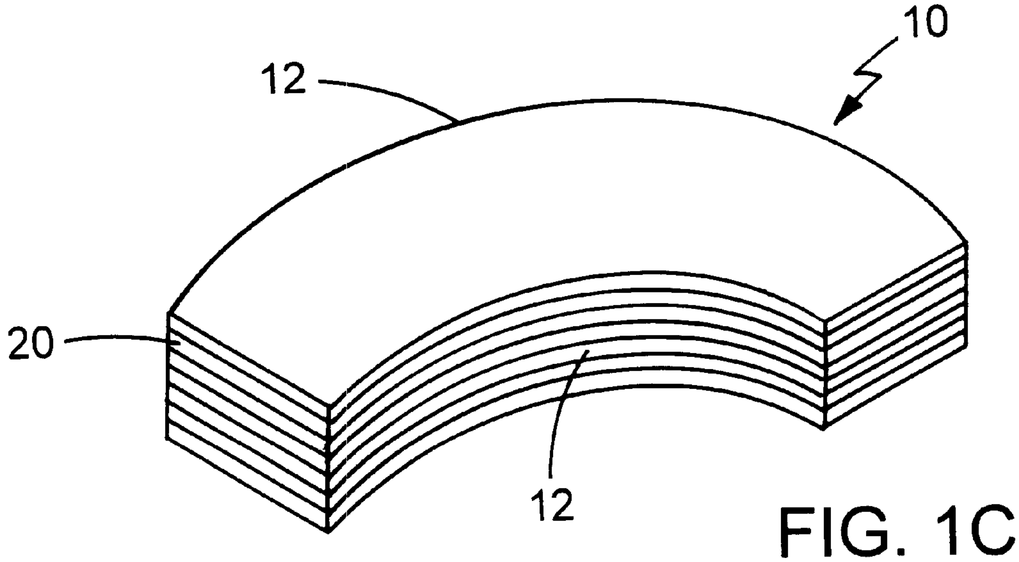
FIG. 1C is a perspective view of a bulk amorphous metal magnetic component having the shape of a polyhedron with oppositely disposed arcuate surfaces and constructed in accordance with the present invention.

The bulk amorphous metal magnetic component 10 of the present invention is a generally three-dimensional polyhedron, and may be a generally rectangular, square or trapezoidal prism. Alternatively, and as depicted in FIG. 1C, the component 10 may have at least one arcuate surface 12. In a preferred embodiment, two arcuate surfaces 12 are provided and disposed opposite each other.

A three-dimensional magnetic component 10 constructed in accordance with the present invention and excited at an excitation frequency "f" to a peak induction level "$B_{max}$" will have a core loss at room temperature less than "L" wherein L is given by the formula $L=0.0074\ f\ (B_{max})^{1.3}+0.000282\ f^{1.5}\ (B_{max})^{2.4}$, the core loss, the excitation frequency and the peak induction level being measured in watts per kilogram, hertz, and teslas, respectively. In a preferred embodiment, the magnetic component has (i) a core-loss of less than or approximately equal to 1 watt-per-kilogram of amorphous metal material when operated at a frequency of approximately 60 Hz and at a flux density of approximately 1.4 Tesla (T); (ii) a core-loss of less than or approximately equal to 12 watts-per-kilogram of amorphous metal material when operated at a frequency of approximately 1000 Hz and at a flux density of approximately 1.0 T. or (iii) a core-loss of less than or approximately equal to 70 watt-per-kilogram of amorphous metal material when operated at a frequency of approximately 20,000 Hz and at a flux density of approximately 0.30T. The reduced core loss of the component of the invention advantageously improves the efficiency of an electrical device comprising it.

The low values of core loss make the bulk magnetic component of the invention especially suited for applications wherein the component is subjected to a high frequency magnetic excitation, e.g., excitation occurring at a frequency of at least about 100 Hz. The inherent high core loss of conventional steels at high frequency renders them unsuitable for use in devices requiring high frequency excitation. These core loss performance values apply to the various embodiments of the present invention, regardless of the specific geometry of the bulk amorphous metal component.

Figure 2:
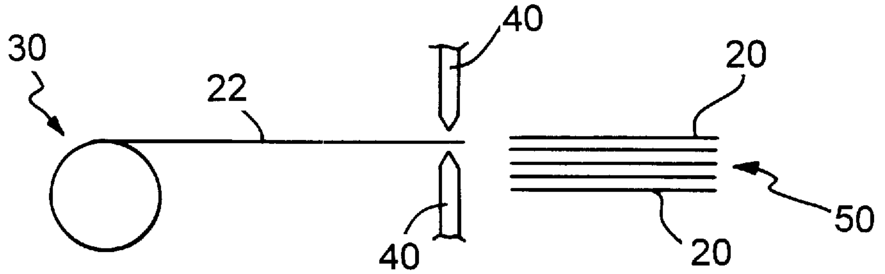
FIG. 2 is a side view of a coil of ferromagnetic amorphous metal strip positioned to be cut and stacked in accordance with the present invention.
Figure 3:
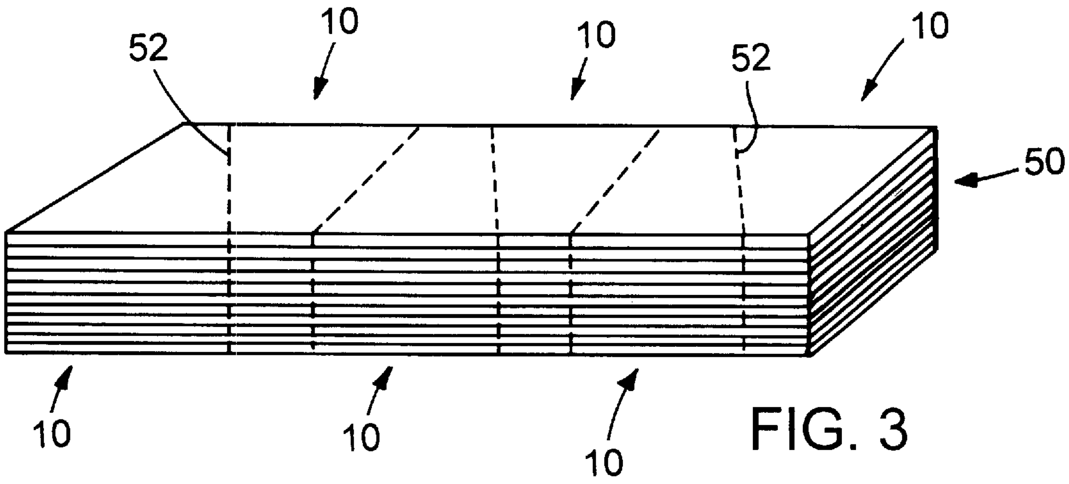
FIG. 3 is a perspective view of a bar of ferromagnetic amorphous metal strips showing the cut lines to produce a plurality of generally trapezoidally-shaped magnetic components in accordance with the present invention.

The present invention also provides a method of constructing a bulk amorphous metal component. As shown in FIG. 2, a roll 30 of ferromagnetic amorphous metal strip material is cut into a plurality of strips 20 having the same shape and size using cutting blades 40. The strips 20 are stacked to form a bar 50 of stacked amorphous metal strip material. The bar 50 is annealed, impregnated with an epoxy resin and cured. The bar 50 can be cut along the lines 52 depicted in FIG. 3 to produce a plurality of generally three-dimensional parts having a generally rectangular, square or trapezoidal prism shape. Alternatively, the component 10 may include at least one arcuate surface 12, as shown in FIG. 1C.

Figure 4:
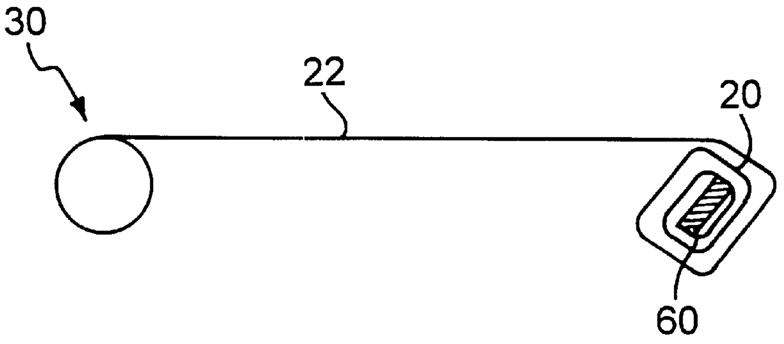
FIG. 4 is a side view of a coil of amorphous metal strip which is being wound about a mandrel to form a generally rectangular core in accordance with the present invention.
Figure 5:
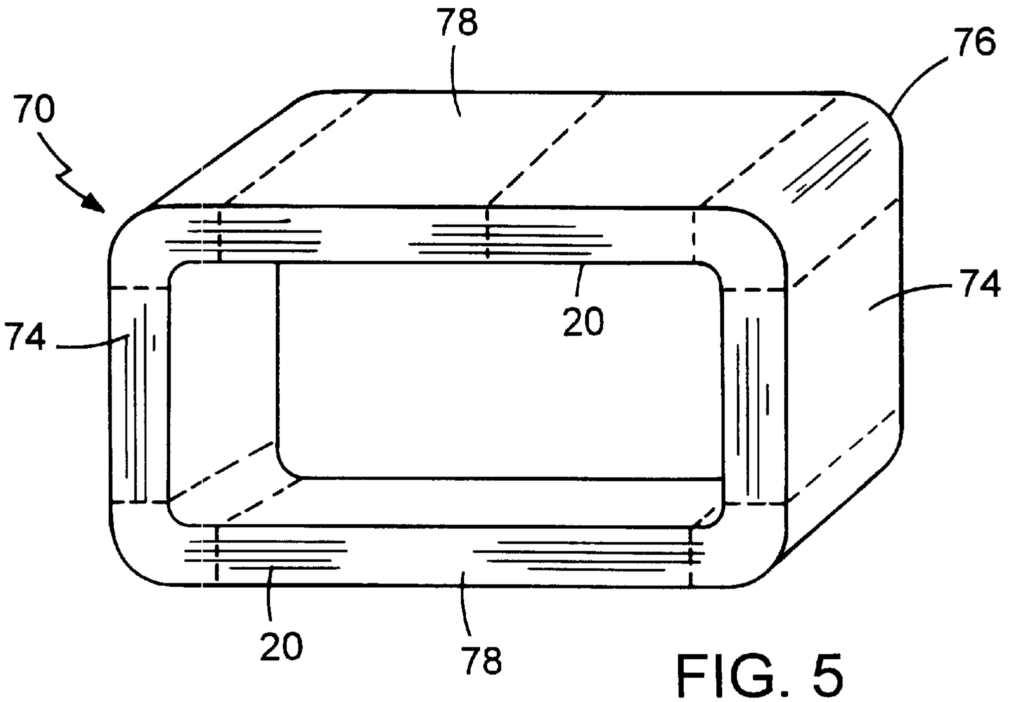
FIG. 5 is a perspective view of a generally rectangular amorphous metal core formed in accordance with the present invention.

In a second embodiment of the method of the present invention, shown in FIGS. 4 and 5, a bulk amorphous metal magnetic component 10 is formed by winding a single ferromagnetic amorphous metal strip 22 or a group of ferromagnetic amorphous metal strips 22 around a generally rectangular mandrel 60 to form a generally rectangular wound core 70. The height of the short sides 74 of the core 70 is preferably approximately equal to the desired length of the finished bulk amorphous metal magnetic component 10. The core 70 is annealed, impregnated with an epoxy resin and cured. Two components 10 may be formed by cutting the short sides 74, leaving the radiused corners 76 connected to the long sides 78_a_ and 78_b_. Additional magnetic components 10 may be formed by removing the radiused corners 76 from the long sides 78_a_ and 78_b_, and cutting the long sides 78_a_ and 78_b_ at a plurality of locations, indicated by the dashed lines 72. In the example illustrated in FIG. 5, the bulk amorphous metal component 10 has a generally three-dimensional rectangular shape, although other three-dimensional shapes are contemplated by the present invention such as, for example, shapes having at least one trapezoidal or square face.

The bulk amorphous metal magnetic component 10 of the present invention can be cut from bars 50 of stacked amorphous metal strip or from cores 70 of wound amorphous metal strip using numerous cutting technologies. The component 10 may be cut from the bar 50 or core 70 using a cutting blade or wheel. Alternately, the component 10 may be cut by electro-discharge machining or with a water jet.

Construction of bulk amorphous metal magnetic components in accordance with the present invention is especially suited for tiles for poleface magnets used in high performance MRI systems, in television and video systems, and in electron and ion beam systems. Magnetic component manufacturing is simplified and manufacturing time is reduced. Stresses otherwise encountered during the construction of bulk amorphous metal components are minimized. Magnetic performance of the finished components is optimized.

The bulk amorphous metal magnetic component 10 of the present invention can be manufactured using numerous ferromagnetic amorphous metal alloys. Generally stated, the alloys suitable for use in component 10 are defined by the formula: $M_{70-85}$ $Y_{5-20}$ $Z_{0-20}$, subscripts in atom percent, where "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta, Hf, Ag, Au, Pd, Pt, and W, (ii) up to ten (10) atom percent of components (Y+Z) can be replaced by at least one of the non-metallic species In, Sn, Sb and Pb, and (iii) up to about one (1) atom percent of the components (M+Y+Z) can be incidental impurities. As used herein, the term "amorphous metallic alloy" means a metallic alloy that substantially lacks any long range order and is characterized by X-ray diffraction intensity maxima which are qualitatively similar to those observed for liquids or inorganic oxide glasses.

The alloy suited for use in the practice of the present invention is ferromagnetic at the temperature at which the component is to be used. A ferromagnetic material is one which exhibits strong, long-range coupling and spatial alignment of the magnetic moments of its constituent atoms at a temperature below a characteristic temperature (generally termed the Curie temperature) of the material. It is preferred that the Curie temperature of material to be used in a device operating at room temperature be at least about 200° C. and preferably at least about 375° C. Devices may be operated at other temperatures, including down to cryogenic temperatures or at elevated temperatures, if the material to be incorporated therein has an appropriate Curie temperature.

As is known in the art, a ferromagnetic material may further be characterized by its saturation induction or equivalently, by its saturation flux density or magnetization. The alloy suitable for use in the present invention preferably has a saturation induction of at least about 1.2 tesla (T) and, more preferably, a saturation induction of at least about 1.5 T. The alloy also has high electrical resistivity, preferably at least about 100 $\mu\Omega$-cm, and most preferably at least about 130 $\mu\Omega$-cm.

Amorphous metal alloys suitable for the practice of the invention are commercially available, generally in the form of continuous thin strip or ribbon in widths up to 20 cm or more and in thicknesses of approximately 20–25 $\mu$m. These alloys are formed with a substantially fully glassy microstructure (e.g., at least about 80% by volume of material having a non-crystalline structure). Preferably the alloys are formed with essentially 100% of the material having a non-crystalline structure. Volume fraction of non-crystalline structure may be determined by methods known in the art such as x-ray, neutron, or electron diffraction, transmission electron microscopy, or differential scanning calorimetry. Highest induction values at low cost are achieved for alloys wherein "M" is iron, "Y" is boron and "Z" is silicon. For this reason, amorphous metal strip composed of an iron-boron-silicon alloy is preferred. More specifically, it is preferred that the alloy contain at least 70 atom percent Fe, at least 5 atom percent B and at least 5 atom percent Si, with the proviso that the total content of B and Si be at least 15 atom percent. Most preferred is amorphous metal strip having a composition consisting essentially of about 11 atom percent boron and about 9 atom percent silicon, the balance being iron and incidental impurities. This strip, having a saturation induction of about 1.56 T and a resistivity of about 137 $\mu\Omega$-cm, is sold by Honeywell International Inc. under the trade designation METLAS® alloy 2605SA-1.

The magnetic properties of the amorphous metal strip appointed for use in component 10 of the present invention may be enhanced by thermal treatment at a temperature and for a time sufficient to provide the requisite enhancement without altering the substantially fully glassy microstructure of the strip. A magnetic field may optionally be applied to the strip during at least a portion, and preferably during at least the cooling portion, of the heat treatment.

An electromagnet system comprising an electromagnet having one or more poleface magnets is commonly used to produce a time-varying magnetic field in the gap of the electromagnet. The time-varying magnetic field may be a purely AC field, i.e. a field whose time average value is zero. Optionally the time varying field may have a non-zero time average value conventionally denoted as the DC component of the field. In the electromagnet system, the at least one poleface magnet is subjected to the time-varying magnetic field. As a result, the pole face magnet is magnetized and demagnetized with each excitation cycle. The time-varying magnetic flux density or induction within the poleface magnet causes the production of heat from core loss therein. In the case of a pole face comprised of a plurality of bulk magnetic components, the total loss is a consequence both of the core loss which would be produced within each component if subjected in isolation to the same flux waveform and of the loss attendant to eddy currents circulating in paths which provide electric continuity between the components.

Bulk amorphous magnetic components will magnetize and demagnetize more efficiently than components made from other iron-base magnetic metals. When used as a pole magnet, the bulk amorphous metal component will generate less heat than a comparable component made from another iron-base magnetic metal when the two components are magnetized at identical induction and excitation frequency. Furthermore, iron-base amorphous metals preferred for use in the present invention have significantly greater saturation induction than do other low loss soft magnetic materials such as permalloy alloys, whose saturation induction is typically 0.6–0.9 T. The bulk amorphous metal component can therefore be designed to operate 1) at a lower operating temperature; 2) at higher induction to achieve reduced size and weight; or, 3) at higher excitation frequency to achieve reduced size and weight, or to achieve superior signal resolution, when compared to magnetic components made from other iron-base magnetic metals.

The teaching of U.S. Pat. No. 5,124.651 recognizes that eddy currents in pole pieces comprising elongated ferromagnetic rods may be reduced by electrically isolating those rods from each other by interposed electrically non-conducting material. The present invention affords a substantial further reduction in the total losses, because the use of the material and construction methods taught herein reduces the losses arising within each individual component from those which would be exhibited in a prior art component made with other materials or construction methods.

As is known in the art, core loss is that dissipation of energy which occurs within a ferromagnetic material as the magnetization thereof is changed with time. The core loss of a given magnetic component is generally determined by cyclically exciting the component. A time-varying magnetic field is applied to the component to produce therein a corresponding time variation of the magnetic induction or flux density. For the sake of standardization of measurement, the excitation is generally chosen such that the magnetic induction varies sinusoidally with time at a frequency "f" and with a peak amplitude "$B_{max}$." The core loss is then determined by known electrical measurement instrumentation and techniques. Loss is conventionally reported as watts per unit mass or volume of the magnetic material being excited. It is known in the art that loss increases monotonically with f and $B_{max}$. Most standard protocols for testing the core loss of soft magnetic materials used in components of poleface magnets (e.g. ASTM Standards A912-93 and A927 (A927M-94)) call for a sample of such materials which is situated in a substantially closed magnetic circuit i.e. a configuration in which closed magnetic flux lines are completely contained within the volume of the sample. On the other hand, a magnetic material as employed in a component such as a poleface magnet is situated in a magnetically open circuit, i.e. a configuration in which magnetic flux lines must traverse an air gap. Because of fringing field effects and non-uniformity of the field, a given material tested in an open circuit generally exhibits a higher core loss. i.e. a higher value of watts per unit mass or volume, than it would have in a closed-circuit measurement. The bulk magnetic component of the invention advantageously exhibits low core loss over a wide range of flux densities and frequencies even in an open-circuit configuration.

Without being bound by any theory, it is believed that the total core loss of the low-loss bulk amorphous metal component of the invention is comprised of contributions from hysteresis losses and eddy current losses. Each of these two contributions is a function of the peak magnetic induction $B_{max}$ and of the excitation frequency f. The magnitude of each contribution is further dependent on extrinsic factors including the method of component construction and the thermomechanical history of the material used in the component. Prior art analyses of core losses in amorphous metals (see, e.g., G. E. Fish, J. Appl. Phys. 57. 3569(1985) and G. E. Fish et al., J. Appl. Phys. 64, 5370(1988)) have generally been restricted to data obtained for material in a closed magnetic circuit. The low hysteresis and eddy current losses seen in these analyses are driven in part by the high resistivities of amorphous metals.

The total core loss $L(B_{max}, f)$ per unit mass of the bulk magnetic component of the invention may be essentially defined by a function having the form $$L(B_{max}, f)=c_1 f(B_{max})^n+c_2 f^q(B_{max})^m$$

wherein the coefficients $c_1$ and $c_2$ and the exponents n, m, and q must all be determined empirically, there being no known theory that precisely determines their values. Use of this formula allows the total core loss of the bulk magnetic component of the invention to be determined at any required operating induction and excitation frequency. It is generally found that in the particular geometry of a bulk magnetic component the magnetic field therein is not spatially uniform. Techniques such as finite element modeling are known in the art to provide an estimate of the spatial and temporal variation of the peak flux density that closely approximates the flux density distribution measured in an actual bulk magnetic component. Using as input a suitable empirical formula giving the magnetic core loss of a given material under spatially uniform flux density, these techniques allow the corresponding actual core loss of a given component in its operating configuration to be predicted with reasonable accuracy.

The measurement of the core loss of the magnetic component of the invention can be carried out using various methods known in the art. A method especially suited for measuring the present component comprises forming a magnetic circuit with the magnetic component of the invention and a flux closure structure means. Optionally, the magnetic circuit may comprise a plurality of magnetic components of the invention and a flux closure structure means. The flux closure structure means preferably comprises soft magnetic material having high permeability and a saturation flux density at least equal to the flux density at which the component is to be tested. Preferably, the soft magnetic material has a saturation flux density at least equal to the saturation flux density of the component. The flux direction along which the component is to be tested generally defines first and second opposite faces of the component. Flux lines enter the component in a direction generally normal to the plane of the first opposite face. The flux lines generally follow the plane of the amorphous metal strips, and emerge from the second opposing face. The flux closure structure means generally comprises a flux closure magnetic component which is constructed preferably in accordance with the present invention but may also be made with other methods and materials known in the art. The flux closure magnetic component also has first and second opposing faces through which flux lines enter and emerge, generally normal to the respective planes thereof. The flux closure component opposing faces are substantially the same size and shape to the respective faces of the magnetic component to which the flux closure component is mated during actual testing. The flux closure magnetic component is placed in mating relationship with its first and second faces closely proximate and substantially proximate to the first and second faces of the magnetic component of the invention, respectively. Magnetomotive force is applied by passing current through a first winding encircling either the magnetic component of the invention or the flux closure magnetic component. The resulting flux density is determined by Faraday's law from the voltage induced in a second winding encircling the magnetic component to be tested. The applied magnetic field is determined by Ampère's law from the magnetomotive force. The core loss is then computed from the applied magnetic field and the resulting flux density by conventional methods.

Referring to FIG. 5, there is illustrated a component 10 having a core loss which can be readily determined by the testing method described hereinafter. Long side **78*b* of core 70 is appointed as magnetic component 10 for core loss testing. The remainder of core 70 serves as the flux closure structure means, which is generally C-shaped and comprises the four generally radiused corners 76, short sides 74 and long side 78*a*. Each of the cuts 72 which separate the radiused corners 76, the short sides 74, and long side 78*a* is optional. Preferably, only the cuts separating long side 78*b* from the remainder of core 70 are made. Cut surfaces formed by cutting core 70 to remove long side 78*b* define the opposite faces of the magnetic component and the opposite faces of the flux closure magnetic component. For testing, long side 78*b* is situated with its faces closely proximate and parallel to the corresponding faces defined by the cuts. The faces of long side 78*b* are substantially the same in size and shape as the faces of the flux closure magnetic component. Two copper wire windings (not shown) encircle long side 78*b*. An alternating current of suitable magnitude is passed through the first winding to provide a magnetomotive force that excites long side 78*b* at the requisite frequency and peak flux density. Flux lines in long side 78*b* and the flux closure magnetic component are generally within the plane of strips 22 and directed circumferentially. Voltage indicative of the time varying flux density within long side 78*b*** is induced in the second winding. Core loss is determined by conventional electronic means from the measured values of voltage and current.

The following examples are provided to more completely describe the present invention. The specific techniques conditions, materials, proportions and reported data set forth to illustrate the principles and practice of the invention are exemplary and should not be construed as limiting the scope of the invention.

EXAMPLE 1

Preparation and Electro-Magnetic Testing of an Amorphous Metal Rectangular Prism $Fe_{80}B_{11}Si_9$ ferromagnetic amorphous metal ribbon, approximately 60 mm wide and 0.022 mm thick, was wrapped around a rectangular mandrel or bobbin having dimensions of approximately 25 mm by 90 mm. Approximately 800 wraps of ferromagnetic amorphous metal ribbon were wound around the mandrel or bobbin producing a rectangular core form having inner dimensions of approximately 25 mm by 90 mm and a build thickness of approximately 20 mm. The core/bobbin assembly was annealed in a nitrogen atmosphere. The anneal consisted of: 1) heating the assembly up to 365° C., 2) holding the temperature at approximately 365° C. for approximately 2 hours; and, 3) cooling the assembly to ambient temperature. The rectangular, wound, amorphous metal core was removed from the core/bobbin assembly. The core was vacuum impregnated with an epoxy resin solution. The bobbin was replaced, and the rebuilt, impregnated core/bobbin assembly was cured at 120° C. for approximately 4.5 hours. When fully cured, the core was again removed from the core/bobbin assembly. Tile resulting rectangular, wound, epoxy bonded, amorphous metal core weighed approximately 2100 g.

A rectangular prism 60 mm long by 40 mm wide by 20 mm thick (approximately 800 layers) was cut from the epoxy bonded amorphous metal core with a 1.5 mm thick cutting blade. The cut surfaces of the rectangular prism and the remaining section of the core were etched in a nitric acid/water solution and cleaned in an ammonium hydroxide/water solution. The remaining section of the core was etched in a nitric acid/water solution and cleaned in an ammonium hydroxide/water solution. The rectangular prism and the remaining section of the core were then reassembled into a full, cut core form. Primary and secondary electrical windings were fixed to the remaining section of the core. The cut core form was electrically tested at 60 Hz, 1,000 Hz, 5,000 Hz and 20,000 Hz and compared to catalogue values for other ferromagnetic materials in similar test configurations (National-Arnold Magnetics, 17030 Muskrat Avenue, Adelanto, Calif. 92301 (1995)). The results are compiled below in Tables 1, 2, 3 and 4.

TABLE 1

Core Loss @ 60 Hz (W/kg)

| Flux Density | Material: Amorphous $Fe_{80}B_{11}Si_9$ (22 μm) | Crystalline Fe-3% Si (25 μm) | Crystalline Fe-3% Si (50 μm) | Crystalline Fe-3% Si (175 μm) | Crystalline Fe-3% Si (275 μm) |
|---|---|---|---|---|---|
| | | National-Arnold Magnetics Silectron | National-Arnold Magnetics Silectron | National-Arnold Magnetics Silectron | National-Arnold Magnetics Silectron |
| 0.3 T | 0.10 | 0.2 | 0.1 | 0.1 | 0.06 |
| 0.7 T | 0.33 | 0.9 | 0.5 | 0.4 | 0.3 |
| 0.8 T | | 1.2 | 0.7 | 0.6 | 0.4 |
| 1.0 T | | 1.9 | 1.0 | 0.8 | 0.6 |
| 1.1 T | 0.59 | | | | |
| 1.2 T | | 2.6 | 1.5 | 1.1 | 0.8 |
| 1.3 T | 0.75 | | | | |
| 1.4 T | 0.85 | 3.3 | 1.9 | 1.5 | 1.1 |

TABLE 2

Core Loss @ 1,000 Hz (W/kg)

| Flux Density | Material: Amorphous $Fe_{80}B_{11}Si_9$ (22 μm) | Crystalline Fe-3% Si (25 μm) | Crystalline Fe-3% Si (50 μm) | Crystalline Fe-3% Si (175 μm) | Crystalline Fe-3% Si (275 μm) |
|---|---|---|---|---|---|
| | | National-Arnold Magnetics Silectron | National-Arnold Magnetics Silectron | National-Arnold Magnetics Silectron | National-Arnold Magnetics Silectron |
| 0.3 T | 1.92 | 2.4 | 2.0 | 3.4 | 5.0 |
| 0.5 T | 4.27 | 6.6 | 5.5 | 8.8 | 12 |
| 0.7 T | 6.94 | 13 | 9.0 | 18 | 24 |
| 0.9 T | 9.92 | 20 | 17 | 28 | 41 |
| 1.0 T | 11.51 | 24 | 20 | 31 | 46 |
| 1.1 T | 13.46 | | | | |
| 1.2 T | 15.77 | 33 | 28 | | |
| 1.3 T | 17.53 | | | | |
| 1.4 T | 19.67 | 44 | 35 | | |

TABLE 3

| Core Loss @ 5,000 Hz (W/kg) | | | | |
|---|---|---|---|---|
| | Material | | | |
| Flux Density | Amorphous $Fe_{80}B_{11}Si_9$ (22 μm) | Crystalline Fe-3% Si (25 μm) | Crystalline Fe-3% Si (175 μm) | Crystalline Fe-3% Si (275 μm) |
| | | National-Arnold Magnetics Silectron | National-Arnold Magnetics Silectron | National-Arnold Magnetics Silectron |
| 0.04 T | 0.25 | 0.33 | 0.33 | 1.3 |
| 0.06 T | 0.52 | 0.83 | 0.80 | 2.5 |
| 0.08 T | 0.88 | 1.4 | 1.7 | 4.4 |
| 0.10 T | 1.35 | 2.2 | 2.1 | 6.6 |
| 0.20 T | 5 | 8.8 | 8.6 | 24 |
| 0.30 T | 10 | 18.7 | 18.7 | 48 |

TABLE 4

| Core Loss @ 10,000 Hz (W/kg) | | | | |
|---|---|---|---|---|
| | Material | | | |
| Flux Density | Amorphous $Fe_{80}B_{11}Si_9$ (22 μm) | Crystalline Fe-3% Si (25 μm) | Crystalline Fe-3% Si (175 μm) | Crystalline Fe-3% Si (275 μm) |
| | | National-Arnold Magnetics Silectron | National-Arnold Magnetics Silectron | National-Arnold Magnetics Silectron |
| 0.04 T | 1.8 | 2.4 | 2.8 | 16 |
| 0.06 T | 3.7 | 5.5 | 7.0 | 33 |
| 0.08 T | 6.1 | 9.9 | 12 | 53 |
| 0.10 T | 9.2 | 15 | 20 | 88 |
| 0.20 T | 35 | 57 | 82 | |
| 0.30 T | 70 | 130 | | |

As shown by the data in Tables 3 and 4, the core loss is particularly low at excitation frequencies of 5000 Hz or more. Thus, the magnetic component of the invention is especially suited for use in poleface magnets.

EXAMPLE 2

Preparation of an Amorphous Metal Trapezoidal Prism $Fe_{80}B_{11}Si_9$ ferromagnetic amorphous metal ribbon, approximately 48 mm wide and 0.022 mm thick, was cut into lengths of approximately 300 mm. Approximately 3,800 layers of the cut ferromagnetic amorphous metal ribbon were stacked to form a bar approximately 48 mm wide and 300 mm long, with a build thickness of approximately 96 mm. The bar was annealed in a nitrogen atmosphere. The anneal consisted of: 1) heating the bar up to 365° C.; 2) holding the temperature at approximately 365° C. for approximately 2 hours; and, 3) cooling the bar to ambient temperature. The bar was vacuum impregnated with an epoxy resin solution and cured at 120° C. for approximately 4.5 hours. The resulting stacked, epoxy bonded, amorphous metal bar weighed approximately 9000 g.

A trapezoidal prism was cut from the stacked, epoxy bonded amorphous metal bar with a 1.5 mm thick cutting blade. The trapezoid-shaped face of the prism had bases of 52 and 62 mm and height of 48 mm. The trapezoidal prism was 96 mm (3,800 layers) thick. The cut surfaces of the trapezoidal prism and the remaining section of the core were etched in a nitric acid/water solution and cleaned in an ammonium hydroxide/water solution.

The trapezoidal prism has a core loss of less than 11.5 W/kg when excited at 1000 Hz to a peak induction level of 1.0T.

EXAMPLE 3

Preparation of Polygonal, Bulk Amorphous Metal Components With Arc-Shaped Cross-Sections $Fe_{80}B_{11}Si_9$ ferromagnetic amorphous metal ribbon, approximately 50 mm wide and 0.022 mm thick, was cut into lengths of approximately 300 mm. Approximately 3,800 layers of the cut ferromagnetic amorphous metal ribbon were stacked to form a bar approximately 50 mm wide and 300 mm long, with a build thickness of approximately 96 mm. The bar was annealed in a nitrogen atmosphere. The anneal consisted of: 1) heating the bar up to 365° C.; 2) holding the temperature at approximately 365° C. for approximately 2 hours; and, 3) cooling the bar to ambient temperature. The bar was vacuum impregnated with an epoxy resin solution and cured at 120° C. for approximately 4.5 hours. The resulting stacked, epoxy bonded, amorphous metal bar weighed approximately 9200 g.

The stacked, epoxy bonded, amorphous metal bar was cut using electro-discharge machining to form a three-dimensional, arc-shaped block. The outer diameter of the block was approximately 96 mm. The inner diameter of the block was approximately 13 mm. The arc length was approximately 90°. The block thickness was approximately 96 mm.

$Fe_{80}B_{11}Si_9$ ferromagnetic amorphous metal ribbon, approximately 20 mm wide and 0.022 mm thick, was wrapped around a circular mandrel or bobbin having an outer diameter of approximately 19 mm. Approximately 1,200 wraps of ferromagnetic amorphous metal ribbon were wound around the mandrel or bobbin producing a circular core form having an inner diameter of approximately 19 mm and an outer diameter of approximately 48 mm. The core had a build thickness of approximately 29 mm. The core was annealed in a nitrogen atmosphere. The anneal consisted of: 1) heating the bar up to 365° C.; 2) holding the temperature at approximately 365° C. for approximately 2 hours; and, 3) cooling the bar to ambient temperature. The core was vacuum impregnated with an epoxy resin solution and cured at 120° C. for approximately 4.5 hours. The resulting wound, epoxy bonded, amorphous metal core weighed approximately 71 g.

The wound, epoxy bonded, amorphous metal core was cut using a water jet to form a semi-circular, three dimensional shaped object. The semi-circular object had an inner diameter of approximately 19 mm, an outer diameter of approximately 48 mm, and a thickness of approximately 20 mm.

The cut surfaces of the polygonal, bulk amorphous metal components with arc-shaped cross sections were etched in a nitric acid/water solution and cleaned in an ammonium hydroxide/water solution.

Each of the polygonal bulk amorphous metal components has a core loss of less than 11.5 W/kg when excited at 1000 Hz to a peak induction level of 1.0T.

EXAMPLE 4

High Frequency Behavior of Low-Loss Bulk Amorphous Metal Components

The core loss data taken in Example 1 above were analyzed using conventional non-linear regression methods. It was determined that the core loss of a low-loss bulk amorphous metal component comprised of $Fe_{80}B_{11}Si_9$ amorphous metal ribbon could be essentially defined by a function having the form $$L(B_{max},f)=c_1 f(B_{max})^n+c_2 f^q (B_{max})^m.$$

Suitable values of the coefficients $c_1$ and $c_2$ and the exponents n, m, and q were selected to define an upper bound to the magnetic losses of the bulk amorphous metal component. Table 5 recites the measured losses of the component in Example 1 and the losses predicted by the above formula, each measured in watts per kilogram. The predicted losses as a function of f (Hz) and $B_{max}$ (Tesla) were calculated using the coefficients $c_1$=0.0074 and $c_2$=0.000282 and the exponents n=1.3, m=2.4, and q=1.5. The measured loss of the bulk amorphous metal component of Example 1 was less than the corresponding loss predicted by the formula.

TABLE 5

| Point | $B_{max}$ (Tesla) | Frequency (Hz) | Measured Core Loss (W/kg) | Predicted Core Loss (W/kg) |
|---|---|---|---|---|
| 1 | 0.3 | 60 | 0.1 | 0.10 |
| 2 | 0.7 | 60 | 0.33 | 0.33 |
| 3 | 1.1 | 60 | 0.59 | 0.67 |
| 4 | 1.3 | 60 | 0.75 | 0.87 |
| 5 | 1.4 | 60 | 0.85 | 0.98 |
| 6 | 0.3 | 1000 | 1.92 | 2.04 |
| 7 | 0.5 | 1000 | 4.27 | 4.69 |
| 8 | 0.7 | 1000 | 6.94 | 8.44 |

TABLE 5-continued

| Point | $B_{max}$ (Tesla) | Frequency (Hz) | Measured Core Loss (W/kg) | Predicted Core Loss (W/kg) |
|---|---|---|---|---|
| 9 | 0.9 | 1000 | 9.92 | 13.38 |
| 10 | 1 | 1000 | 11.51 | 16.32 |
| 11 | 1.1 | 1000 | 13.46 | 19.59 |
| 12 | 1.2 | 1000 | 15.77 | 23.19 |
| 13 | 1.3 | 1000 | 17.53 | 27.15 |
| 14 | 1.4 | 1000 | 19.67 | 31.46 |
| 15 | 0.04 | 5000 | 0.25 | 0.61 |
| 16 | 0.06 | 5000 | 0.52 | 1.07 |
| 17 | 0.08 | 5000 | 0.88 | 1.62 |
| 18 | 0.1 | 5000 | 1.35 | 2.25 |
| 19 | 0.2 | 5000 | 5 | 6.66 |
| 20 | 0.3 | 5000 | 10 | 13.28 |
| 21 | 0.04 | 20000 | 1.8 | 2.61 |
| 22 | 0.06 | 20000 | 3.7 | 4.75 |
| 23 | 0.08 | 20000 | 6.1 | 7.41 |
| 24 | 0.1 | 20000 | 9.2 | 10.59 |
| 25 | 0.2 | 20000 | 35 | 35.02 |
| 26 | 0.3 | 20000 | 70 | 75.29 |

Having thus described the invention in rather full detail, it will be understood that such detail need not be strictly adhered to but that various changes and modification may suggest themselves to one skilled in the art, all falling within the scope of the present invention as defined by the subjoined claims.

What is claimed is:

1. A low-loss bulk amorphous metal magnetic component comprising:

a plurality of substantially similarly shaped layers of ferromagnetic amorphous metal strips laminated together to form a polyhedrally shaped part, wherein each of said ferromagnetic amorphous metal strips includes a composition defined essentially by the formula: $M_{70-85}$ $Y_{5-20}$ $Z_{0-20}$, subscripts in atom percent, where "M" is at least one of Fe, Ni and Co, "Y" is at least one of B, C and P, and "Z" is at least one of Si, Al and Ge; with the provisos that (i) up to 10 atom percent of component "M" can be replaced with at least one of the metallic species Ti, V, Cr, Mn, Cu, Zr, Nb, Mo, Ta, Hf, Ag, Au, Pd, Pt, and W, (ii) up to 10 atom percent of components (Y+Z) can be replaced by at least one of the non-metallic species In, Sn, Sb and Pb and (iii) up to about one (1) atom percent of the components (M+Y+Z) can be incidental impurities; and wherein said low-loss bulk amorphous metal magnetic component when operated at an excitation frequency "f" to a peak induction level $B_{max}$ has a core-loss less than "L" wherein L is given by the formula L=0.0074 $f(B_{max})^{1.3}$+0.000282 $f^{1.5}(B_{max})^{2.4}$, said core loss, said excitation frequency and said peak induction level being measured in watts per kilogram, hertz, and teslas, respectively.

2. A bulk amorphous metal magnetic component as recited by claim 1, wherein said magnetic component has a core-loss of less than or approximately equal to 70 watts-per-kilogram of amorphous metal material when operated at a frequency of approximately 20,000 Hz and at a flux density of approximately 0.30 T.

3. A bulk amorphous metal magnetic component as recited by claim 1, wherein each of said amorphous metal strips has a composition containing at least 70 atom percent Fe, at least 5 atom percent B, and at least 5 atom percent Si, with the proviso that the total content of B and Si is at least 15 atom percent.

4. A bulk amorphous metal magnetic component as recited by claim 3, wherein each of said ferromagnetic amorphous metal strips has a composition defined essentially by the formula $Fe_{80}B_{11}Si_{9}$.

5. A bulk amorphous metal magnetic component as recited by claim 1, wherein said component has the shape of a three-dimensional polyhedron with at least one rectangular cross-section.

6. A bulk amorphous metal magnetic component as recited by claim 1, wherein said component has the shape of a three-dimensional polyhedron with at least one trapezoidal cross-section.

7. A bulk amorphous metal magnetic component as recited by claim 1, wherein said component has the shape of a three-dimensional polyhedron with at least one square cross-section.

8. A bulk amorphous metal magnetic component as recited by claim 1, wherein said component includes at least one arcuate surface.

9. A bulk amorphous metal magnetic component as recited by claim 1, wherein said magnetic component has a core-loss of less than or approximately equal to 1 watt-per-kilogram of amorphous metal material when operated at a frequency of approximately 60 Hz and at a flux density of approximately 1.4 T.

10. A bulk amorphous metal magnetic component as recited by claim 1, wherein said magnetic component has a core-loss of less than or approximately equal to 12 watts-per-kilogram of amorphous metal material when operated at a frequency of approximately 1,000 Hz and at a flux density of approximately 1.0 T.

* * * * *